United States Patent
Hasler et al.

(10) Patent No.: US 12,249,856 B2
(45) Date of Patent: Mar. 11, 2025

(54) MODULE FOR LARGE SCALE ENERGY STORAGE

(71) Applicant: Hitachi Energy Ltd, Zürich (CH)

(72) Inventors: Jean-Philippe Hasler, Västerås (SE); Juergen Steinke, Albbruck (DE); Gunnar Ingeström, Västerås (SE); Jan Svensson, Västerås (SE); Lexuan Meng, Västerås (SE); Haofeng Bai, Västerås (SE); Tong Wu, Västerås (SE); Theodore Soong, Toronto (CA)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/565,973

(22) PCT Filed: May 31, 2021

(86) PCT No.: PCT/EP2021/064573
§ 371 (c)(1),
(2) Date: Nov. 30, 2023

(87) PCT Pub. No.: WO2022/253407
PCT Pub. Date: Dec. 8, 2022

(65) Prior Publication Data
US 2024/0266847 A1    Aug. 8, 2024

(51) Int. Cl.
*H02J 7/00* (2006.01)
(52) U.S. Cl.
CPC ........ *H02J 7/00304* (2020.01); *H02J 7/0016* (2013.01); *H02J 2207/50* (2020.01)
(58) Field of Classification Search
USPC ................................................. 320/166–167
See application file for complete search history.

(56) References Cited

U.S. PATENT DOCUMENTS

| 5,545,933 | A | 8/1996 | Okamura et al. |
| 9,559,529 | B1 | 1/2017 | Button et al. |

(Continued)

FOREIGN PATENT DOCUMENTS

| CN | 101217078 A | 7/2008 |
| CN | 201153087 Y | 11/2008 |

(Continued)

OTHER PUBLICATIONS

Helling et al., "A Battery Modular Multilevel Management System (BM3) for electric vehicles and stationary energy storage systems," 2014 16th European Conference on Power Electronics and Applications, Lappeenranta, Finland, 2014, pp. 1-10, doi: 10.1109/EPE.2014.6910821.

(Continued)

*Primary Examiner* — Samuel Berhanu
(74) *Attorney, Agent, or Firm* — Procopio, Cory, Hargreaves & Savitch LLP

(57) ABSTRACT

A module (100) for use in an energy storage system is provided, including a first terminal (110) and a second terminal (112); a supercapacitor branch (120) including an arrangement (122) of one or more supercapacitors (124), and a resistive bypass branch (130) including at least a first bypass switch (132) and a resistance (134) connected in series. The supercapacitor branch and the resistive bypass branch are connected in parallel between the first terminal and the second terminal. The module may further include a direct bypass branch (140) having a second bypass switch (142), the direct bypass branch being also connected in parallel with the supercapacitor branch (120) between the first and second terminals. A control method of such a module and an energy storage system including several such modules, are also provided.

12 Claims, 3 Drawing Sheets

(56) References Cited

U.S. PATENT DOCUMENTS

| | | | |
|---|---|---|---|
| 2012/0074905 A1* | 3/2012 | Jeong | H02J 7/0016 |
| | | | 320/116 |
| 2013/0009600 A1* | 1/2013 | Jeong | B60L 58/40 |
| | | | 320/167 |
| 2015/0092311 A1 | 4/2015 | Wang et al. | |
| 2015/0115736 A1 | 4/2015 | Snyder | |
| 2016/0308191 A1 | 10/2016 | Becker-irvin et al. | |
| 2018/0123357 A1 | 5/2018 | Beaston et al. | |
| 2018/0372072 A1 | 12/2018 | Danielsen et al. | |

FOREIGN PATENT DOCUMENTS

| | | |
|---|---|---|
| CN | 105991054 A | 10/2016 |
| CN | 106229956 A | 12/2016 |
| CN | 108322056 A | 7/2018 |
| CN | 109860741 A | 6/2019 |
| DE | 102009025211 A1 | 1/2010 |
| JP | H07-099142 A | 4/1995 |
| JP | 2010-509898 A | 3/2010 |
| JP | 2016508363 A | 3/2016 |
| JP | 2017-521987 A | 8/2017 |
| JP | 2018011502 A | 1/2018 |
| KR | 10-2127888 B1 | 6/2020 |
| KR | 10-2021-0046782 A | 4/2021 |
| WO | 2012/010353 A1 | 1/2012 |
| WO | 2016/044931 A1 | 3/2016 |

OTHER PUBLICATIONS

Hu, "Design and Specification for Safe and Reliable Battery Systems for Large UPS", White Paper 207, Schneider Electric—Data Center Science Center, 13 pages.

Lell et al., "Innovative Safety Concept to Shutdown Short Circuit Currents in Battery Systems up to 1000V Based on Ultrafast Pyrofuse Technology", 2018 IEEE Holm Conference on Electrical Contacts, Albuquerque, NM, USA, 2018, 6 pages, doi: 10.1109/HOLM.2018.8611656.

International Preliminary Report On Patentability for the corresponding International Application No. PCT/EP2021/064573 dated Sep. 8, 2023, 6 pages.

International Search Report and Written Opinion of the International Searching Authority for the corresponding International Application No. PCT/EP2021/064573 dated Feb. 14, 2022, 12 pages.

* cited by examiner

MODULE FOR LARGE SCALE ENERGY STORAGE

CROSS-REFERENCE TO RELATED APPLICATIONS

The present application is a national stage entry of International Patent App. No. PCT/EP2021/064573, filed on May 31, 2021, which is hereby incorporated herein by reference as if set forth in full.

TECHNICAL FIELD

The present disclosure generally relates to the field of energy storage for power grid stabilization. In particular, the present disclosure relates to fault handling in an energy storage system.

BACKGROUND

As both production and consumption of electrical energy varies with time, stabilizing an electrical power grid may present a challenge. To compensate for various peaks in production and consumption, a modern electrical power grid may include various forms of energy storages in which energy produced during periods of lower demand may be at least temporally stored and later released during subsequent periods of higher demand. Such energy storages may include everything from large scale hydroelectric dams down to smaller battery banks.

As an alternative to rechargeable batteries, supercapacitors have presented themselves as a viable option. Due to their construction, supercapacitors may both accept and deliver charge faster than rechargeable batteries, and also survive more charging and discharging cycles. To allow for an increased storage capability, multiple supercapacitors may be connected together (in series and/or in parallel) to form large scale energy storage systems.

However, large scale energy storage based on supercapacitors may also present challenges in terms of both fault protection capabilities and ability to provide uninterrupted service even in the event of a fault.

SUMMARY

To at least partly overcome the above challenge, the present disclosure provides a module for use in an energy storage system (and a method of operating/controlling the same), and an energy storage system as defined by the independent claims. Further embodiments of the module, energy storage system and the method are defined by the dependent claims.

According to a first aspect of the present disclosure, a module for use in an energy storage system is provided. The module includes a first terminal and a second terminal, via which the module may be connected to e.g. one or more other modules and/or to an electrical power grid. The module further includes a supercapacitor branch, including an arrangement of one or more supercapacitors. The module further includes a resistive bypass branch including at least a first bypass switch and a resistance connected in series. In the module, the supercapacitor branch and the resistive bypass branch are connected in parallel between the first terminal and the second terminal.

As used herein, the term "supercapacitor" refers to a capacitor having a capacitance value higher than normal capacitors, but with lower voltage limits. Such a supercapacitor bridges a gap between normal (electrolytic) capacitors and rechargeable batteries. A supercapacitor may also be referred to as an "ultracapacitor" or "Electrochemical Double Layer Capacitor (EDLC)".

If a fault (such as e.g. a short circuit across one or more of the supercapacitors in the supercapacitor branch) occurs within the module, the bypass switch may be closed such that a remaining energy of the supercapacitor branch may be discharged/burned via the resistance. By lowering or emptying the energy within the faulty module, the fault may be cleared and operation of e.g. an energy storage system in which the module forms part may at least temporally continue to operate as intended.

In one or more embodiments, the module may further include a direct bypass branch including at least a second bypass switch. The direct bypass branch may also be connected in parallel with the supercapacitor branch and the resistive bypass branch, between the first terminal and the second terminal. Herein, the word "direct bypass branch" refers to a branch not relying on (or not including) a series connected resistance such as found in the resistive bypass branch.

The direct bypass branch may be activated (by closing the second bypass switch) in order to completely bypass the module and the supercapacitor branch. This may take place e.g. after a sufficient energy has been discharged/burned via the resistance in the resistive bypass branch. It may be envisaged e.g. to first close the first bypass switch, discharge energy via the resistance, and then bypass the module/supercapacitor branch by closing the second bypass switch once sufficient energy has been discharged. Herein, that a sufficient energy has been discharged/burned may e.g. correspond to a situation wherein the remaining energy in the supercapacitor branch is low energy such that the closing of the second bypass switch does not introduce any safety risk.

Herein, a "bypass switch" refers to a switch which is at least sufficient to close a circuit but not necessarily sufficient to open a circuit. Phrased differently, the bypass switch does not have to be a circuit breaker capable of breaking a high-current path.

In one or more embodiments, the module may be such that there is no fuse, or similar component, connected in series with the arrangement of the one or more supercapacitors and any one of the first terminal and the second terminal. The present disclosure provides the insight that the use of supercapacitors instead of e.g. traditional rechargeable batteries may allow to avoid having to insert a fuse or similar within the supercapacitor branch, thereby providing a reduced complexity of the circuit(s) and e.g. a reduced cost of manufacturing.

In one or more embodiments, the module may be such that there is no switch or circuit breaker connected in series with the arrangement of one or more supercapacitors and any one of the first terminal and the second terminal. This may provide an additional reduction of circuit complexity and manufacturing cost.

In one or more embodiments, the module may be such that there is neither a fuse, switch nor circuit breaker connected in series with the arrangement of one or more supercapacitors and any one of the first terminal and the second terminal. This may provide even more reduction of complexity and manufacturing cost.

In one or more embodiments, the module may be such that the arrangement of one or more supercapacitors are connected directly between the first terminal and second terminal, i.e. without any other electrical components (such as switches, breakers, fuses, resistances, etc.) therebetween.

This may provide an even further reduction of circuit complexity and manufacturing cost.

In one or more embodiments, the module may further include an array of diodes. In the array, each diode may be connected in reverse across at least one supercapacitor of the one or more supercapacitors.

Providing the array of diodes may for example prevent an excessive voltage from being applied across the supercapacitors during e.g. discharge when the first bypass switch is closed. An applied negative voltage may for example be limited by a forward voltage of the diodes.

In one or more embodiments, the arrangement of one or more supercapacitors may include two or more supercapacitors connected in series. It is envisaged that the number of supercapacitors may be selected to match e.g. a specific requirement in terms of storage voltage capacity, etc., and a higher such voltage may be obtained by series connection of multiple supercapacitors.

In one or more embodiments, the arrangement of one or more supercapacitors may include two or more supercapacitors connected in parallel. It is envisaged that the number of supercapacitors may be selected to match e.g. a specific requirement in terms of current supply capacity, etc., and a higher such current supply capacity may be obtained by parallel connection of multiple supercapacitors.

It is of course also envisaged to combine series and parallel connection of multiple supercapacitors. For example, a particular storage voltage may be obtained by a string of a particular number of supercapacitors connected in series. A particular current supply capacity may be obtained by a particular number of such strings connected in parallel. Other variations are of course also envisaged.

According to a second aspect of the present disclosure, a method of operating a module according to the first aspect (or according to any embodiment thereof) is provided. The method includes detecting an occurrence of a fault associated with the one or more supercapacitors of the module. The method further includes lowering a remaining energy in the one or more supercapacitors by closing the first bypass switch, thereby discharging the one or more supercapacitors through/via the resistance.

As described earlier herein, such a method may provide for a reduction of a remaining energy in the supercapacitor branch of the module to be sufficiently reduced, such that the fault in the module may be hindered from negatively affecting other modules within the energy storage system.

The detection of the fault could for example be performed by a controller or similar, and/or based on supercapacitor internal diagnostics. For example, a short circuit fault may be detected by measuring a voltage across one or more supercapacitors, and indicated by a (sudden) decrease in such a voltage due to the short circuit. Generally herein, a "fault in the module" or a "fault associated with the one or more supercapacitors" may also include other faults than short circuits, such as for example loss of communication with e.g. a control unit, over-temperatures in the supercapacitors or in bus-bars, or similar. Other faults which may be handled by discharging the energy of the supercapacitors by closing the first bypass switch and using the resistance are also envisaged although not explicitly stated herein.

In one or more embodiments, the method may further include determining whether the remaining energy in the one or more supercapacitors is below a certain threshold. The method may further include to, upon determining that the remaining energy is below the certain threshold, directly bypass the one or more supercapacitors by closing the second bypass switch.

In one or more embodiments, the fault may be a short-circuit across at least one of the one or more supercapacitors.

According to a third aspect of the present disclosure, an energy storage system is provided. The energy storage system includes a plurality of modules of the first aspect (or any embodiment thereof), and control means (e.g. a computer implemented controller) for controlling at least one of the modules in accordance with the method of the second aspect (or any embodiment thereof). Herein, it is envisaged that the "control means" includes all means necessary to both detect the fault, and to command and control e.g. the various bypass switches and similar.

In one or more embodiments, the energy storage system further includes at least a second plurality of modules according to the first aspect (or any embodiment thereof) connected in series. The first plurality of modules and the second plurality of modules are connected in parallel, as described earlier herein.

The present disclosure relates to all possible combinations of features recited in the claims. Objects and features described according to the first aspect may be combinable with, or replaced by, objects and features described according to the second aspect and/or the third aspect, and vice versa.

Further objects and advantages of the various embodiments of the present disclosure will be described below by means of exemplifying embodiments.

BRIEF DESCRIPTION OF THE DRAWINGS

Exemplifying embodiments will be described below with reference to the accompanying drawings, in which.

Figure 1A:
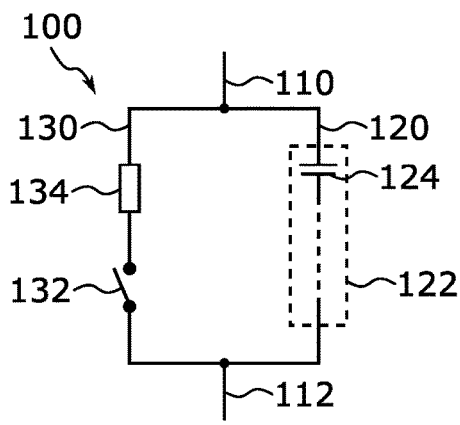
FIGS. 1a to 1e schematically illustrate various example embodiments of modules for use in an energy storage system, according to the present disclosure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may be exaggerated for illustrative purposes and, thus, are provided to illustrate the general structures of the embodiments.

DETAILED DESCRIPTION

With reference to FIGS. 1a to 1e, the concept of a module according to the present disclosure will now be described in more detail.

FIG. 1a schematically illustrates an example embodiment of a module 100 which may be included as part of an energy storage system (not shown). The module 100 includes a first terminal 110 and a second terminal 112. The terminals 110 and 112 may for example be used to connect the module to one or more other modules, and/or to an electrical power grid, as part of the energy storage system.

A supercapacitor branch 120 is connected between the first terminal 110 and the second terminal 112 and includes an arrangement 122 including at least one supercapacitor 124. In the module 100, only a single supercapacitor 124 is illustrated in FIG. 1a, but it is envisaged that the arrangement 122 may include also more than one supercapacitor. If that is the case, the supercapacitors 124 in the arrangement 122 in the supercapacitor branch 120 may be connected in series and/or in parallel as needed to meet specific voltage and/or current supply requirements.

A resistive bypass branch 130 is also connected between the first terminal 110 and the second terminal 112, i.e. in parallel with the supercapacitor branch 120. The resistive bypass branch 130 includes a first bypass switch 132 and a resistance 134 which are connected in series as shown in FIG. 1a.

As described earlier herein, if a fault (such as e.g. a short circuit) occurs within the arrangement 122 of supercapacitors 124, a remaining energy within the arrangement 122 may be drained/burned via the resistance 134 by closing the first bypass switch 132. This procedure may continue at least until a remaining energy in the arrangement 122 is/goes below a certain threshold.

Figure 1B:
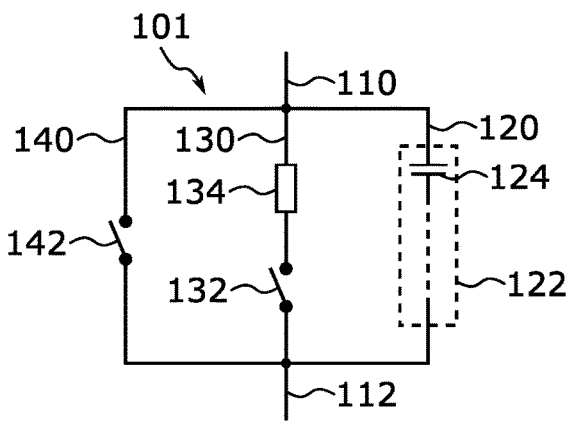

FIG. 1b schematically illustrates another example embodiment of a module 101. In addition to the elements/components of the module 100 described with reference to FIG. 1a, the module 101 further includes a direct bypass branch 140 connected between the first terminal 110 and the second terminal 112, and also in parallel with the supercapacitor branch 120 and the resistive bypass branch 130. The direct bypass branch 140 includes a second bypass switch 142. It is envisaged that the second bypass switch 142 may be closed once the remaining energy of the arrangement 122 has gone below the certain threshold (after draining/burning via the resistance 134 due to the closing of the first bypass switch 132), and thereby fully bypass the module 100. By so doing, in case of a fault, the module may be bypassed such that it does not interfere with the functionality of e.g. other modules in the energy storage system (not shown) of which the module 101 forms part.

With reference to FIGS. 1a and 1b, it should be noted that a fault in the arrangement 122 of the modules 100 and 101 may thus be handled without the need for other components (such as fuses, additional switches, etc.) e.g. in series with the arrangement 122 within the supercapacitor branch 120. This is a result of the insight that the use of supercapacitors 124 instead of e.g. traditional rechargeable batteries as means for energy storage allows to not include such additional components (such as e.g. fuses) in the circuit. As described earlier herein, leaving out such additional components may allow for a less complex circuitry, with e.g. a lower footprint, and with e.g. a reduced cost of manufacturing.

In some embodiments of the modules 100 and 101, it is envisaged that there is at least no fuse connected in series with the arrangement 122 within the supercapacitor branch 120. In some embodiments, it is envisaged that there is at least no switch (or circuit breaker) connected in series with the arrangement 122 within the supercapacitor branch 120. In some embodiments, it is envisaged that there is neither a fuse nor a switch (or circuit breaker) connected in series with the arrangement 122 within the supercapacitor branch 120. Within all such embodiments, "something not in series with the arrangement" is to be interpreted as there being no such "something" between the arrangement 122 and any of the first terminal 110 and the second terminal 112. In some embodiments, the arrangement 122 of the one or more supercapacitors 124 may therefore be connected directly between the first terminal 110 and the second terminal 112. Herein, "directly" of course includes there being e.g. connection wires, bus-bars or similar, but no additional electrical components such as resistors, switches, fuses, or similar.

Herein, a "bypass switch" is envisaged as being e.g. a disconnector, a circuit breaker or an electronic switch. As described earlier, such a bypass switch does not necessarily need to be able to break a larger current, in which case an electronic switch may be enough, reducing the need for more expensive and complex disconnectors and/or circuit breakers.

Figure 1C:
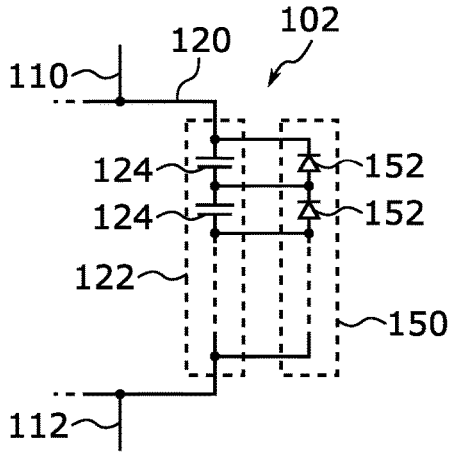

FIG. 1c schematically illustrates a further example embodiment of a module 102 (wherein any branch other than the supercapacitor branch 120 is not illustrated), which further includes an array 150 of diodes 152. Each diode 152 is connected in reverse (with respect to polarity) across a respective supercapacitor 124. As described earlier herein, the diode array 150 may help to prevent damage to the supercapacitors 124 due to a negative voltage which may appear during discharge of the supercapacitors 124 (via the resistance in the resistive bypass branch) during a fault. By connecting the diodes 152 in reverse across the supercapacitors 124, the generated negative voltage during discharge may turn on the diodes 152 and prevent an amplitude of the negative voltage from increasing to more than a forward voltage of the diodes 152.

Figure 1D:
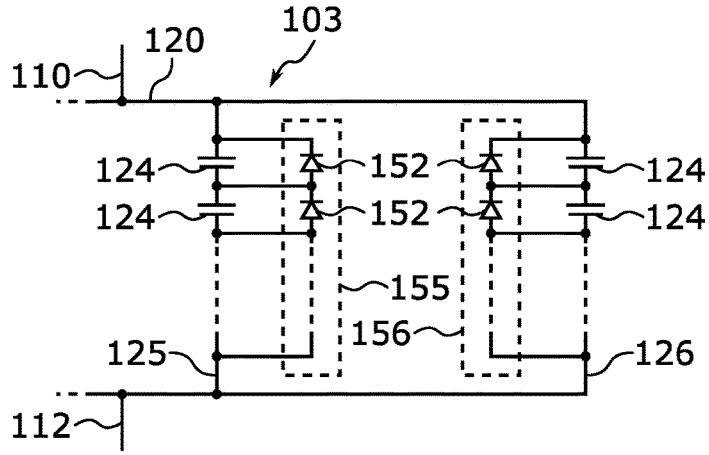
Figure 1E:
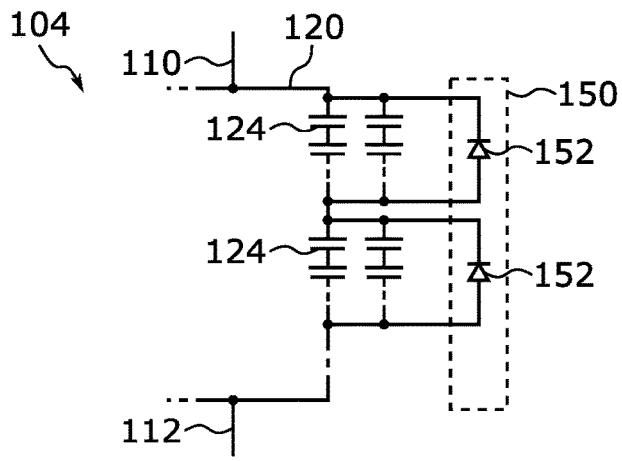

FIGS. 1d and 1e schematically illustrate further example embodiments of modules 103 and 104, respectively. In the module 103, the supercapacitor branch 120 includes two sub-branches 125 and 126, each including a plurality of supercapacitors 124 connected in series. Each sub-branch 125 and 126 is further provided with a respective diode array 155 and 156, each including diodes 152 connected in reverse across a respective supercapacitor 124. In the module 104, the supercapacitor branch 120 includes series-connected blocks of supercapacitors, wherein each block includes one or more parallel strings of series-connected supercapacitors 124. For each block, a diode 152 of the diode array 150 is connected in reverse across the block. Here, each diode is connected in reverse across more than a single supercapacitor.

It is also envisaged that, if there are no diodes included, the supercapacitor branch of a module as described herein may still be configured as in the modules 103 and/or 104 (i.e. with two parallel sub-branches and/or with series connected blocks of parallel strings of series-connected supercapacitors). Other configurations of the supercapacitor branch 120 are also envisaged, wherein the supercapacitors 124 in the arrangement 122 are provided and connected in a way which meets required performance in e.g. terms of storage voltage and/or supply current. The idea of using at least a resistive bypass branch (and possibly also a direct bypass branch) applies to all such configurations of the supercapacitor branch 120 described in the embodiments shown in FIGS. 1c-1e.

A method of operating a module as described herein will now be described in more detail with reference to FIGS. 2a and 2b.

Figure 2A:
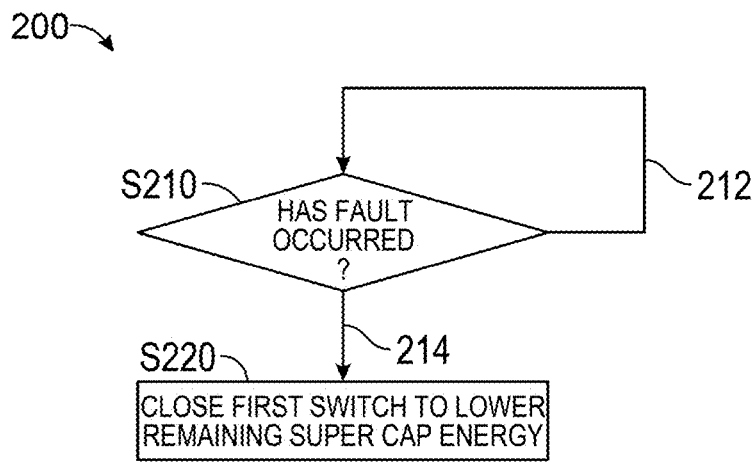
FIGS. 2a and 2b schematically illustrate flows of various example embodiments of methods of operating a module, according to the present disclosure, and FIG. 3 schematically illustrates an example embodiment of an energy storage system according to the present disclosure.

FIG. 2a schematically illustrates a flow of an example embodiment of a method 200. In a step S210, the method 200 includes detecting whether a fault associated with one or more supercapacitors in the module has occurred. If it is determined that no fault has occurred, the method 200 may continue to monitor the supercapacitors as indicated by the arrow 212. If, on the other hand, it is determined that a fault has occurred, the method 200 may proceed as indicated by the arrow 214 to a further step S220.

Detecting the fault could for example be either from a supercapacitor cabinet/system, and may for example be based on current and/or voltage measurements, or e.g. by a battery management system (BMS) based on supercapacitor internal diagnostics. A voltage measurement may for example show a sudden decrease in voltage, which may indicate that e.g. a short circuit has occurred. Likewise, a current measurement may for example show a sudden increase in current, which may also indicate e.g. a short circuit fault. Whether a voltage is to be indicative of a fault may for example be figured out in accordance with specifications provided by a manufacturer of the supercapacitors, or similar. As described earlier herein, a fault is not necessarily required to be a short circuit fault. Other types of faults envisaged within the present disclosure include for example loss of BMS communication, supercapacitor over-temperatures, supercapacitor cabinet busbar over-temperatures, etc.

The step S220 includes lowering a remaining energy in the (one or more) supercapacitors of the module by closing the first bypass switch within the resistive bypass branch. By so doing, the supercapacitors may be discharged through the resistance of the resistive bypass branch, and the fault may thereby be handled without negatively affecting other modules within a same energy storage system.

Figure 2B:
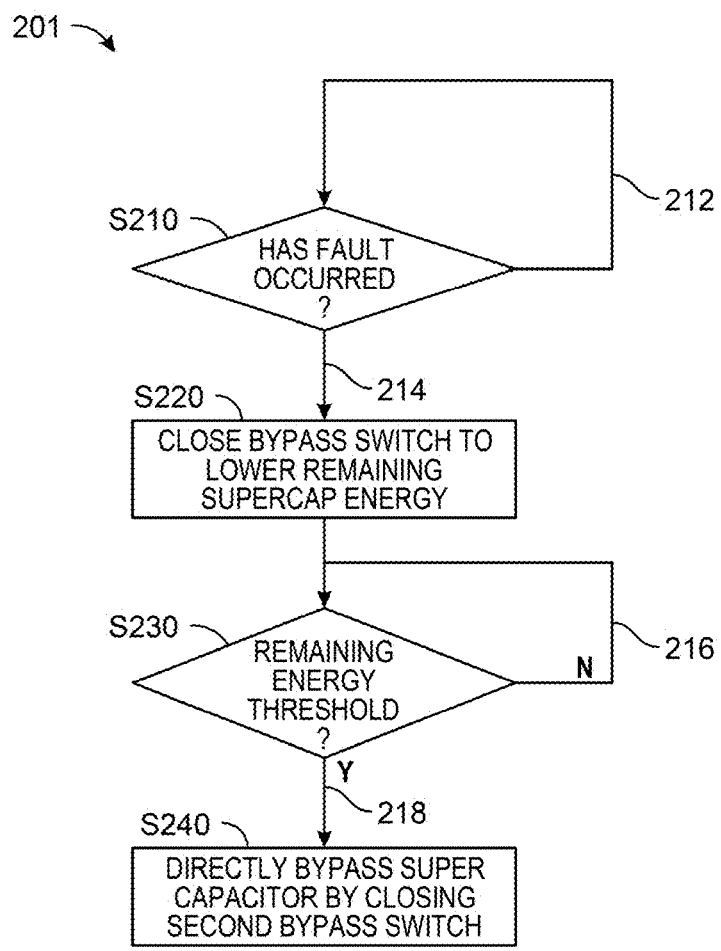

FIG. 2b schematically illustrates a flow of another example embodiment of a method 201. In the method 201, an additional step S230 includes determining whether the remaining energy in the (one or more) supercapacitors is below a certain threshold. If the remaining energy is determined to still be higher than the certain threshold, the method 201 may for example wait (as indicated by the arrow 216) until the threshold is reached. If it is determined that the remaining energy is below the certain threshold, the method 201 may proceed (as indicated by the arrow 218) to a step S240, in which the supercapacitors are then directly bypassed by closing the second bypass switch within a direct bypass branch as described earlier herein. The module may then be fully bypassed, and current no longer required to flow through the resistance of the resistive bypass branch of the module.

An energy storage system according to the present disclosure will now be described with reference to FIG. 3.

Figure 3:
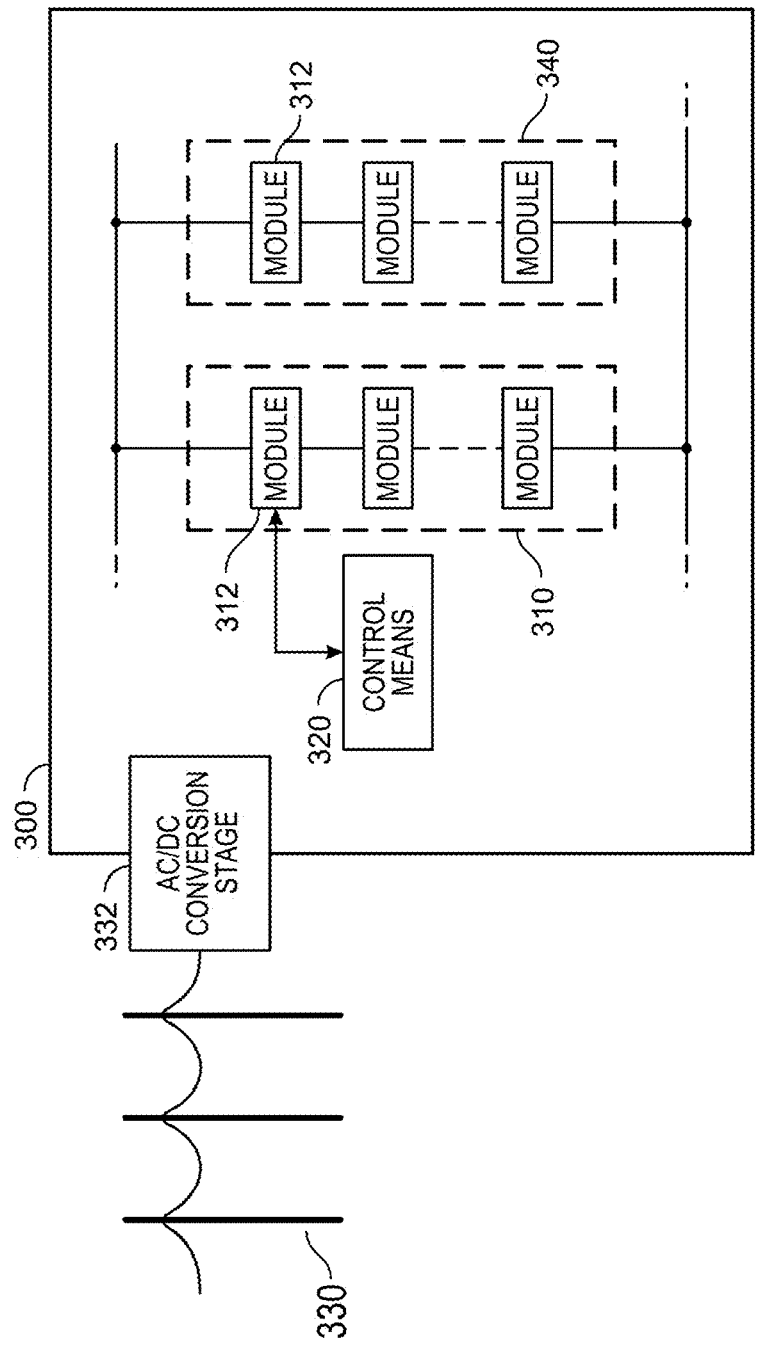

FIG. 3 schematically illustrates an energy storage system 300, including a plurality 310 of modules 312 connected in series. The system 300 also includes control means 320 (such as e.g. a computer implemented controller, or similar) for controlling at least one of the modules 312. Although not illustrated in FIG. 3, it is envisaged that the system also 300 includes means necessary for e.g. detecting whether a fault has occurred within a module 312, and the control means 320 is thus such that the module 312 may be controlled in accordance with a method as described herein, for example any one of the methods 200 and 201 described above with reference to FIGS. 2a and 2b. In some embodiments, it is envisaged that the control means 320 may instead form part of a module 312, and i.e. that each module 312 may have its own internal control means 320.

The system 300 may be connected e.g. to an electrical power grid 330, in order to provide stabilization of the electrical power grid 330 in times when e.g. a demand for power is high. As an example, during times when a demand for power is lower, the energy storage system may receive power from the grid 330 in order to charge the supercapacitors in the modules 312. During times when the demand for power on the grid 330 is higher, the increased demand may be compensated for by the system 300 instead providing power to the grid 330 from the supercapacitors of the modules 312. If the electrical power grid 330 is an AC power grid, the connection to the electrical power grid 330 may be provided via an AC/DC conversion stage 332. Although not explicitly shown in FIG. 3, it is envisaged that such an AC/DC conversion stage 332 may, for control purposes, also be connected to the control means 320.

As illustrated in FIG. 3, the system 300 may also include at least one further plurality 340 of series-connected modules (as e.g. described herein). The further plurality 340 may be connected in series with the plurality 310.

In summary, the use of supercapacitors may enable a faster stabilization (due to the faster response time in terms of charging/discharging of the supercapacitors compared to e.g. traditional rechargeable batteries), and also an increased reliability as supercapacitors may handle an increased number of such charging/discharging cycles. The modules, control method therefor, as well as the energy storage system as described herein, provide an improved reliability in that a fault (e.g. a short circuit) within a module may be properly handled, and the module even completely bypassed, such that the operation of the other modules are not negatively affected by the occurrence of such a fault, and such that the system as a whole may still be available thereafter. As each module has its own means of handling a fault (the one or more bypass branches), fault handling may be distributed within the energy storage system. Additionally, if used, one or more diodes as described in here provides further protection against negative voltages.

Although features and elements have been described above in particular combinations, each feature or element may be used alone without the other features and elements or in various combinations with or without other features and elements.

Additionally, variations to the disclosed embodiments may be understood and effected by the skilled person in practicing the claimed invention, from a study of the drawings, the disclosure, and the appended claims. In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A module for use in an energy storage system, including:
   a first terminal and a second terminal;
   a supercapacitor branch including an arrangement of one or more supercapacitors, and
   a resistive bypass branch including at least a first bypass switch and a resistance connected in series,
   wherein the supercapacitor branch and the resistive bypass branch are connected in parallel between the first terminal and the second terminal;
   further including a direct bypass branch including at least a second bypass switch but not relying on or including a series connected resistance, wherein the direct bypass branch is also connected in parallel with the supercapacitor branch and the resistive bypass branch, between the first terminal and the second terminal;
   wherein the first bypass switch is configured to, upon an occurrence of a fault associated with the one or more supercapacitors, be closed such that the one or more supercapacitors are discharged through the resistance, thereby lowering a remaining energy in the one or more supercapacitors;
   wherein the second bypass switch is configured to subsequently be closed in order to directly bypass the one or more supercapacitors upon an occurrence of the remaining energy in the one or more supercapacitors being below a certain threshold.

2. The module of claim 1, wherein there is no fuse connected in series with the arrangement of one or more supercapacitors and any one of the first terminal and the second terminal.

3. The module of claim 1, wherein there is no switch or circuit breaker connected in series with the arrangement of one or more supercapacitors and any one of the first terminal and the second terminal.

4. The module of claim 1, wherein there is no fuse, switch or circuit breaker connected in series with the arrangement of one or more supercapacitors and any one of the first terminal and the second terminal.

5. The module of claim 1, wherein the arrangement of one or more supercapacitors are connected directly between the first terminal and the second terminal.

6. The module of claim 1, further including an array of diodes, wherein each diode in said array of diodes is connected in reverse across at least one supercapacitor of said one or more supercapacitors.

7. The module of claim 1, wherein the arrangement of one or more supercapacitors include two or more supercapacitors connected in series.

8. The module of claim 1, wherein the arrangement of one or more supercapacitors include two or more supercapacitors connected in parallel.

9. A method of operating a module according to claim 1, including:
   a) detecting an occurrence of a fault associated with the one or more supercapacitors;
   b) lowering a remaining energy in the one or more supercapacitors by closing the first bypass switch, thereby discharging the one or more supercapacitors through the resistance;
   c-i) determining whether the remaining energy in the one or more supercapacitors is below a certain threshold, and
   c-ii) upon determining that the remaining energy is below the certain threshold, directly bypassing the one or more supercapacitors by closing the second bypass switch.

10. The method of claim 9, wherein the fault is a short-circuit across at least one of the one or more supercapacitors.

11. An energy storage system including a plurality of modules according to claim 1 connected in series, comprising:
   a controller and/or supercapacitor internal diagnostics means configured to detect an occurrence of a fault associated with the one or more supercapacitors of at least one module of the plurality of modules;
   control means configured to, for the at least one module of the plurality of modules, close the first bypass switch, thereby discharging the one or more supercapacitors through the resistance, whereby a remaining energy in the one or more supercapacitors is lowered;
   means configured to, for the at least one module of the plurality of modules, determine whether the remaining energy in the one or more supercapacitors is below a certain threshold,
   the control means further configured to, for the at least one module of the plurality of modules, close the second bypass switch upon determining that the remaining energy is below the certain threshold, thereby directly bypassing the one or more supercapacitors;
   and means for carrying out the following operations:
   detecting an occurrence of a fault associated with the one or more supercapacitors;
   lowering a remaining energy in the one or more supercapacitors by closing the first bypass switch, thereby discharging the one or more supercapacitors through the resistance;
   determining whether the remaining energy in the one or more supercapacitors is below a certain threshold, and
   upon determining that the remaining energy is below the certain threshold, directly bypassing the one or more supercapacitors by closing the second bypass switch.

12. The energy storage system of claim 11, further including at least a second plurality of modules connected in series, wherein the first plurality of modules and the at least a second plurality of modules are connected in parallel.

* * * * *